United States Patent
Biesecker et al.

(10) Patent No.: US 10,169,563 B2
(45) Date of Patent: Jan. 1, 2019

(54) ENCRYPTION AUTHORIZATION DONGLE HAVING VOLATILE MEMORY

(71) Applicant: International Business Machines Corporation, Armonk, NY (US)

(72) Inventors: Timothy Biesecker, Pointblank, TX (US); Louie A. Dickens, Tucson, AZ (US); Mark S. Fleming, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/418,203

(22) Filed: Jan. 27, 2017

(65) Prior Publication Data
US 2018/0218140 A1 Aug. 2, 2018

(51) Int. Cl.
*G06F 21/34* (2013.01)
*G06F 21/57* (2013.01)
*G06F 21/60* (2013.01)

(52) U.S. Cl.
CPC .......... *G06F 21/34* (2013.01); *G06F 21/575* (2013.01); *G06F 21/602* (2013.01)

(58) Field of Classification Search
CPC ....... G06F 21/34; G06F 21/602; G06F 21/575
USPC .................................................. 726/1–3, 19
See application file for complete search history.

(56) References Cited

U.S. PATENT DOCUMENTS

| | | |
|---|---|---|
| 7,174,017 B2 | 2/2007 | Bantz et al. |
| 7,735,145 B2 | 6/2010 | Kuehnel et al. |
| 7,978,857 B2 * | 7/2011 | Nishiguchi ............. G06F 21/10 380/277 |
| 8,495,385 B2 | 7/2013 | Idani et al. |
| 8,522,053 B2 | 8/2013 | Matsushima et al. |
| 8,868,898 B1 | 10/2014 | Van Hoof |
| 9,552,181 B1 * | 1/2017 | Gusmano ............. G06F 3/1238 |
| 2002/0026424 A1 * | 2/2002 | Akashi ..................... G06F 21/10 705/57 |
| 2007/0061265 A1 | 3/2007 | Hovnanian et al. |

(Continued)

FOREIGN PATENT DOCUMENTS

CN 103605933 A 2/2014

OTHER PUBLICATIONS

Anonymous, "USB Encryption Adapter," An IP.com Prior Art Database Technical Disclosure, IP.com No. IPCOM000237994D, IP.com Electronic Publication Date: Jul. 24, 2014, 5 pgs.

(Continued)

*Primary Examiner* — Jahangir Kabir
(74) *Attorney, Agent, or Firm* — James L. Olsen

(57) ABSTRACT

Embodiments of the present invention disclose a method, computer program product, and device for accessing encrypted data. A communication link may be established between an authorization dongle and a secure device having encrypted data stored thereon. A communication link may also be established between the authorization dongle and a secure server. An encryption key associated with the encrypted data may be received from the secure server. The encryption key may be stored in volatile memory on the authorization dongle. An indication that a user is attempting to access the encrypted data may be received. The encryption key may be transmitted from the authorization dongle to the secure device in response to the user attempting to access the encrypted data.

16 Claims, 5 Drawing Sheets

(56) References Cited

U.S. PATENT DOCUMENTS

| | | |
|---|---|---|
| 2008/0022116 A1 | 1/2008 | Akiyama |
| 2010/0306544 A1 | 12/2010 | Lionetti et al. |
| 2011/0016317 A1 | 1/2011 | Abe |
| 2012/0210119 A1 | 8/2012 | Baxter et al. |
| 2014/0317394 A1* | 10/2014 | Buhler ............... G06F 9/4416 713/2 |
| 2016/0255498 A1 | 9/2016 | Jager et al. |

OTHER PUBLICATIONS

Keylock, "In the fight against piracy . . . choose your weapon wisely," htttps://www.keylok.com/products, printed Nov. 3, 2016, 1 pg.

Ragan, S. "USB 'Ciphering Dongle' Offers Instant Full Disk Encryption for USB Drives," http://www.securityweek.com/usb-ciphering-dongle-offers-instant-full-disk-encryption-usb-drives, printed Nov. 3, 2016, 7 pgs.

Unknown, "GoSafe: File Encryption using USB Dongle," http://softwarefileprotection.com/gosafe-file-encryption, printed Nov. 3, 2016, 8 pgs.

Unknown, "USB/IP Project," http://usbip.sourceforge.net/, printed Nov. 3, 2016, 5 pgs.

Biesecker et al., "Encryption Authorization Dongle Having Volatile Memory," U.S. Appl. No. 15/694,188, filed Sep. 1, 2017.

List of IBM Patents or Patent Applications Treated as Related, signed Sep. 1, 2017, 2 pages.

* cited by examiner

ENCRYPTION AUTHORIZATION DONGLE HAVING VOLATILE MEMORY

BACKGROUND

The present disclosure relates generally to the field of computer security, and more particularly to encryption authorization of a secured device using an authorization dongle.

Encryption is used in computer systems to prevent unauthorized parties from accessing data. Plaintext data on memory may be encrypted to generate ciphertext which can only be read if decrypted. Data may be encrypted by using an encryption algorithm. The data may only be decrypted by applying an encryption key, which reverses the order of the encryption algorithm to convert the ciphertext back into plaintext. Some encryption systems incorporate proprietary dongles; these may be separate storage devices which may store the encryption key. The proprietary dongle may be communicatively coupled to the encrypted device to allow the user to access the encrypted data volume using the corresponding encryption key.

SUMMARY

Embodiments of the present invention disclose a method, computer program product, and system for accessing encrypted data. The method may include establishing a communication link between an authorization dongle and a secure device that has encrypted data stored thereon. The authorization dongle may be communicatively coupled with the secure device using a data connector. The method may further include establishing a communication link between the authorization dongle and a secure server. The authorization dongle may be communicatively coupled with the secure server using a network adapter. The method may further include receiving an encryption key from the secure server. The encryption key may be associated with encrypted data stored on the secure device. The method may further include storing the encryption key on volatile memory of the authorization dongle. Furthermore, the method may include receiving, from the secure device, an indication that a user is attempting to access encrypted data stored on the secure device. In response to a user attempting to access the encrypted data stored on the secure device, the authorization dongle may transmit the encryption key to the secure device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
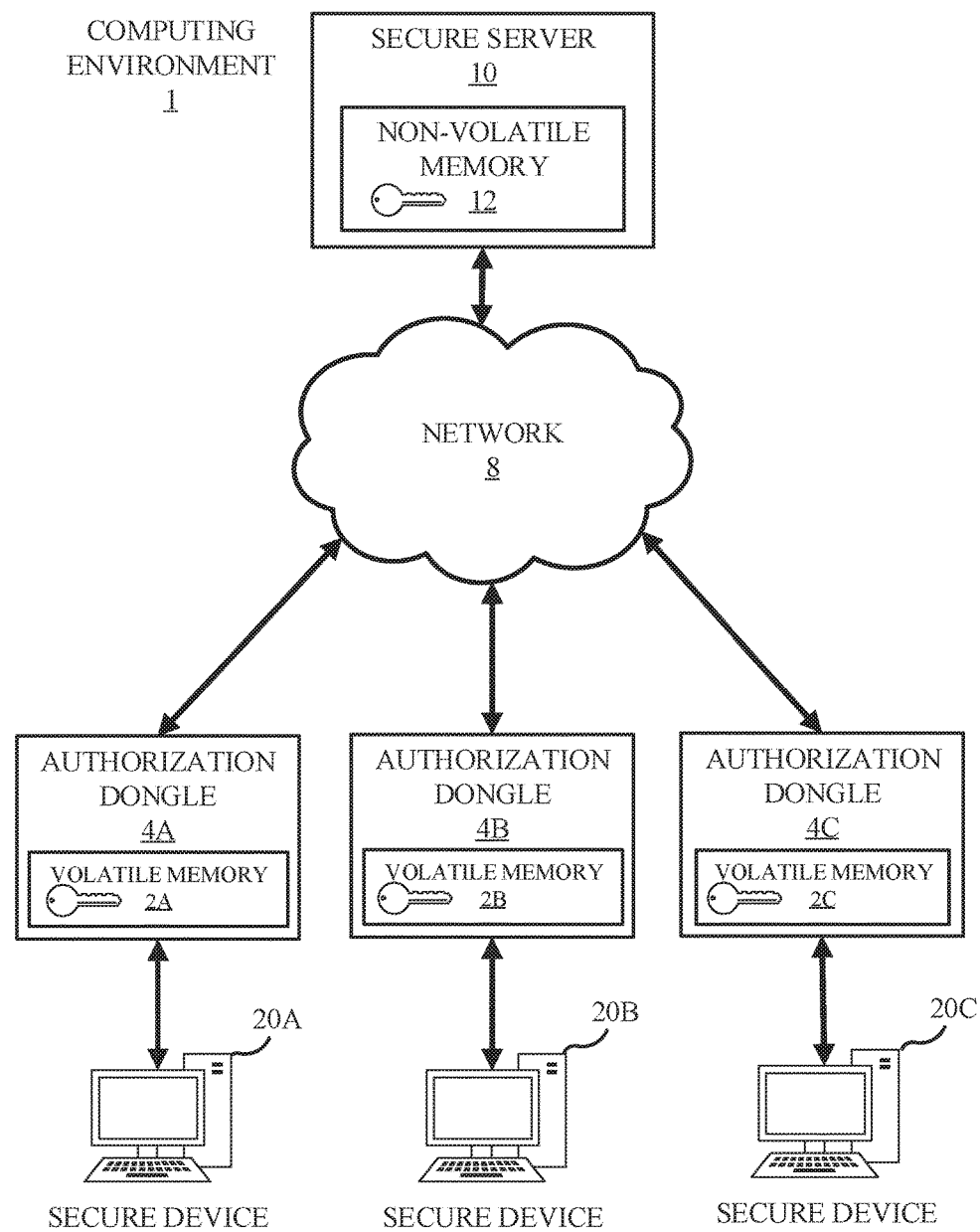
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer security, and in particular to encryption authorization of a secured device using an authorization dongle. While the present disclosure is not necessarily limited to such applications, various aspects of the disclosure may be appreciated through a discussion of various examples using this context.

Current proprietary dongles store encryption keys on non-volatile memory (e.g., flash storage) located on the dongle. The encryption key may be used to decrypt data on a secure device (e.g., a device with encrypted data). After accessing data on the secured device, the proprietary dongle may be locked away in a safe place to prevent future unauthorized data access, while preserving the key on the non-volatile memory located on the proprietary dongle.

The aforementioned design may be problematic for a variety of reasons. First, if the proprietary dongle is lost or stolen, there may be immediate security issues, as the encryption key may be derived from the dongle. In this case, a new encryption key may be necessary to prevent unauthorized data access. Furthermore, if the proprietary dongle is lost, the encryption key must be written to a new proprietary dongle. In addition to presenting security issues, replacing proprietary dongles and encryption keys may be time-consuming and expensive.

Logistical issues may also occur as a result of storing encryption keys in non-volatile memory physically located on a proprietary dongle. In some situations, there may be multiple proprietary dongles for multiple respective secure devices. Each proprietary dongle must have an exact match to its respective secure device. In these situations, it may be time-consuming to sift through a collection of proprietary dongles when attempting to access a secure device. This may be especially problematic in emergency situations, in which timing is critical, as the correct proprietary dongle must be quickly located and installed onto the secure device to access the data. This may require the user to meticulously organize the collection of proprietary dongles, which may expend time and resources.

Further problems may arise as this model only ensures security if the proprietary dongle is physically removed from the secure device. If the secure device and proprietary dongle are stolen together, a thief may have access to the encrypted volumes, without an option for the owner to remotely deactivate the authorization key. In this regard, the proprietary dongle must be physically removed from the secure device to ensure security. However, this may be problematic in any situation requiring the secure device to be rebooted, as the proprietary dongle must be physically replaced or data access will be locked. This may require the owner to maintain 24-hour coverage of the secure device, as the device cannot be restored remotely. These scenarios present additional operation costs for the owner.

The present disclosure relates to an authorization dongle system having an authorization dongle, a secure server, and a secure device. The secure server may have non-volatile memory storing an encryption key. The authorization dongle may have volatile memory mirroring the encryption key stored on the secure server. To mirror the data, the authorization dongle may include a network adapter to communicatively couple the authorization dongle to the secure server. This may allow data transfer from the non-volatile memory of the secure server to the volatile memory of the authorization dongle. The encryption key present on the authorization dongle (e.g., the key mirrored from the secure server) may be used to access encrypted data on a secure device. To connect to the secure device, the authorization dongle may include a data connector, which allows the encryption key to be transferred and installed onto the secure device, allowing access to the encrypted data volume.

In some embodiments, the aforementioned authorization dongle device may be highly secure, as if it is removed from the connected device, the volatile memory containing the encryption key will be cleared. This may protect the encryption key data, as it may not be possible to copy the image present on the authorization dongle after it is disconnected from a power source (e.g., the connected device). Additionally, if the authorization dongle is connected to the secure device, and they are stolen simultaneously, the volatile memory may clear if power is not maintained in the device. This may allow the authorization dongle to maintain security even while connected to the secure device, whereas previous dongle designs require removal to ensure security.

Furthermore, in some embodiments the authorization dongle system may be configured to be remotely updated. The encryption key may be mirrored onto the authorization dongle from remotely located non-volatile memory on a secure server. This may overcome inconvenience in previous solutions, which required removal of the dongle to maintain security. In previous designs, users may have to maintain 24-hour coverage of the device, as the data could not be accessed without the proprietary dongle connected. This may be problematic in situations such as power outages or system errors, as users may have to physically replace the proprietary dongle to allow access to the encrypted data. The present disclosure overcomes this issue, as it may be remotely mirrored onto the authorization dongle without requiring users to physically replace the dongle. This may also overcome logistical issues, as authorization dongles may stay connected to a secure device while maintaining security. This may eliminate the need to meticulously organize a set of propriety dongles, as well as situations requiring the user to quickly locate and replace the dongles.

It is to be understood that the aforementioned advantages are example advantages and should not be construed as limiting. Embodiments of the present disclosure can contain all, some, or none of the aforementioned advantages while remaining within the spirit and scope of the present disclosure.

FIG. 1 illustrates an example computing environment 1 having a secure server 10, a network 8, authorization dongles 4A-C, volatile memory 2A-C, non-volatile memory 12, and secure devices 20A-C, in accordance with embodiments of the present disclosure. The authorization dongles 4A-C, volatile memory 2A-C, and secure devices 20A-C may hereafter be collectively referred to as authorization dongle(s) 4, volatile memory 2, and secure device(s) 20. The secure device(s) 20 may contain encrypted data. The authorization dongle(s) 4 may contain volatile memory 2 that includes an encryption key necessary to access the encrypted data present on the secure device(s) 20. When the encryption key is installed on (e.g., transferred to) the secure device 20, a user may access the encrypted data volume. The authorization dongle(s) 4 may be communicatively coupled to the secure device(s) 20 to allow installation of the encryption key. The secure device(s) 20 may be configured to provide power to the authorization dongle(s) 4, allowing the volatile memory 2 to be maintained. If the authorization dongle(s) 4 are removed from the power source, the volatile memory 2 may be cleared. This may prevent unauthorized users from accessing encrypted data on the secure device(s) 20 if the authorization dongle(s) 4 or secure device(s) 20 are stolen.

When the volatile memory 2 on the authorization dongle(s) 4 is cleared, the secure server 10 may be configured to restore the encryption key. The secure server 10 may have non-volatile memory 12 that includes the encryption key(s) necessary to access the encrypted data in the secure device(s) 20. For example, the secure server 10 may store (e.g., in a table) a set of encryption keys for each of (or for a subset of) the secure devices 20. In some embodiments, each secure device 20 may have its own, unique encryption key, and the secure server may be configured to maintain a list of the encryption keys and a corresponding identifier (e.g., a MAC address or other identifier) that associates each encryption key with a particular secure device 20 and/or a particular authorization dongle 4. In some embodiments, the secure server 10 may assign the identifier to the authorization dongle(s) 4 and/or secure device(s) 20.

The authorization dongle(s) 4 may be communicatively coupled to the secure server 10 via a network 8. The network 8 can be implemented using any number of any suitable communications media. For example, the network 8 may be a wide area network (WAN), a local area network (LAN), an internet, or an intranet. In certain embodiments, the authorization dongle(s) 4 and the secure server 10 may be local to each other and communicate via any appropriate local communication medium. For example, the authorization dongle(s) 4 and the secure server 10 may communicate using a local area network (LAN), one or more hardwire connections, a wireless link or router, or an intranet. In some embodiments, the authorization dongle(s) 4 and the secure server 10 may be communicatively coupled using a combination of one or more networks and/or one or more local connections. For example, a first authorization dongle 4A may be hardwired to the secure server 10 (e.g., connected with an Ethernet cable) while a second authorization dongle 4B may communicate with the secure server 10 using the network 8 (e.g., over the Internet).

In some embodiments, the network 8 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 8. In some embodiments, the secure server 10 may be a central hub from which one or more authorization dongle(s) 4 can establish a communication connection, such as in a client-server networking model. Alternatively, the secure server 10 and authorization dongle(s) 4 may be configured in any other suitable networking relationship (e.g., in a peer-to-peer configuration or using any other network topology)

After establishing a connection between the authorization dongle(s) 4 and the secure server 10 (e.g., after power is restored to the authorization dongle(s) 4), the secure server 10 may be configured to transfer the encryption key to the authorization dongle(s) 4. The authorization dongle(s) 4 may be configured to request the encryption key from the secure server 10. Likewise, the secure server 10 may be configured to request to transfer the encryption key stored in the non-volatile memory 12 to the authorization dongle(s) 4. In some embodiments, the secure server 10 may be configured to authenticate the authorization dongle(s) 4 and/or a user who powered on the secure device(s) 20 that is connected to the authorization dongle 4 (e.g., using a user name or device ID and a password) prior to transmitting the encryption key to the authorization dongle(s) 4.

The authorization dongle system 1 may include any number of secure servers 10, networks 8, authorization dongles 4, and secure devices 20 organized in any suitable arrangement. For example, in an embodiment shown in FIG. 1, there may be a single secure server 10 communicatively coupled to a single network 8, which may connect to multiple authorization dongles 4A-C, each corresponding to a respective secure device 20A-C. However, in other embodiments, there may be multiple secure servers 10 communicatively coupled to multiple networks 8. Likewise, there may be multiple secure servers 10 communicatively coupled to a single network 8. In embodiments with multiple secure servers 10, each secure server may be configured to manage and provide encryption keys to a subset of the authorization dongles 4. Alternatively, each secure server may be capable of validating, and transmitting encryption keys to, all of the authorization dongles 4.

In an embodiment of the present disclosure, the encryption key may be split between two or more authorization dongles 4, which may be communicatively coupled to a single secure device 20. In this embodiment, the two or more authorization dongles 4 may be required to access the encrypted data of the secure device 20. For example, authorization dongles 4A and 4B may correspond to secure device 20A. In this example, the encryption key(s) may be split between authorization dongles 4A and 4B in order to access secure device 20A. In some embodiments, an encryption key on an authorization dongle 4 may correspond to multiple secure devices 20 (e.g., authorization dongle 4A corresponding to secure devices 20A and 20B), allowing a single authorization dongle to grant access to data stored on each of the multiple secure devices 20. Similarly, a single authorization dongle 4 may store two or more encryption keys that correspond to two or more different secure devices 20. In these embodiments, the authorization dongle 4 may be simultaneously linked to multiple secure devices 20. In some embodiments, each authorization dongle 4 corresponds to a separate network 8. Any suitable arrangement of servers 10, networks 8, authorization dongles 4, and secure devices 20 may be implemented.

In some embodiments, configuration data (e.g., storage configuration or network configuration data) of the secure server 10 and/or secure device(s) 20 may be stored on the authorization dongle(s) 4. The configuration data may be split between the authorization dongle(s) 4 and the secure server 10 or secure device(s) 20. For example, a first portion of the configuration data may be stored on a first authorization dongle 4A (e.g., in non-volatile memory on authorization dongle 4A, see FIG. 2), and a second portion of the configuration data may be stored on either the secure server 10 or secure device 20A. This may ensure the secure server 10 or secure device 20A will not boot (i.e., allow a user to utilize the secure device 20A) if authorization dongle 4A is not present. Overall, this set-up may be administered to prevent utilization of the secure server 10 or secure device(s) 20 in the event the secure server 10 or secure device(s) 20 are stolen without the authorization dongle(s) 4.

Figure 2:
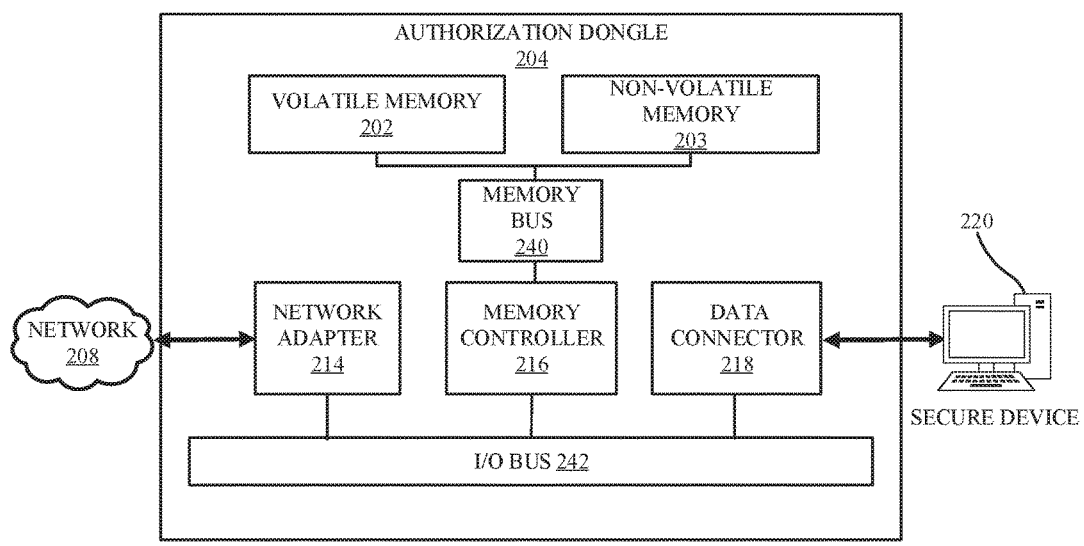
FIG. 2 depicts a block diagram of an example authorization dongle, in accordance with embodiments of the present disclosure.

FIG. 2 illustrates components of an authorization dongle 204. In some embodiments, the secure device 220, authorization dongle 204, and network 208 may be substantially similar to, or the same as, secure device 20, authorization dongle 4, and network 8 from FIG. 1. The authorization dongle 204 may have volatile memory 202, non-volatile memory 203, a memory controller 216, a network adapter 214, and a data connector 218, all of which may be communicatively coupled, directly or indirectly, for inter-component communication via a memory bus 240 and/or an I/O bus 242.

The volatile memory 202 and non-volatile memory 203 may be accessed via a memory bus 240. The memory bus 240 may include logic configured to transfer data between the volatile and non-volatile memory 202, 203 and the memory controller 216. The memory controller 216 may include logic configured to control data transfer between the memory bus 240 and I/O bus 242. The I/O bus may include logic configured to transfer data between the memory controller 216 and the data connector 218 and network adapter 214. The data connector 218 may be communicatively coupled to the secure device 220 to permit data transfer between the authorization dongle 204 and secure device 220. The network adapter 214 may be communicatively coupled to the network 208 to permit data transfer between the authorization dongle 204 and the network 208. The network adapter 214 may be any suitable network adapter, such as a modem or a network interface controller.

The secure device 220 may be configured to read/write to the volatile and non-volatile memory 202, 203. The data connector 218 may communicatively link the memory controller 216 to the secure device 220, allowing data transfer to occur between the volatile and non-volatile memory 202, 203 and the secure device 220. The data connector 218 may be configured to transfer the encryption key from the volatile memory 202 of the authorization dongle 204 to the secure device 220.

The secure server (not shown) may be configured to read/write to the volatile and non-volatile memory 202, 203. The network adapter 214 may communicatively link the memory controller 216 to the secure server via the network 208. This may allow data transfer to occur between the volatile and non-volatile memory 202, 203 and the secure server. The network adapter 214 of the authorization dongle 24 may be configured to receive the encryption key from the non-volatile memory of the secure server 210. The encryption key may then be transferred from network adapter 214 to the volatile memory 202 of the authorization dongle 204. The transfer of the encryption key from the network adapter 214 and the volatile memory 202 may be controlled by the memory controller 216.

The volatile memory 202 may be any suitable type of volatile memory (e.g., memory maintained while connected to a power source). For example, volatile memory 202 may be Random Access Memory (RAM). The selected RAM may be Dynamic Random Access Memory (DRAM), Extended Data-Out RAM (EDO RAM), Synchronous DRAM (SDRAM), Double Data Rate SDRAM (DDR SDRAM), or Static Random Access Memory (SRAM). The type of RAM may be selected based on the data storage, power, data transfer, and price requirements. For example, DRAM is generally inexpensive compared to SRAM, as DRAM requires one transistor and one capacitor for every data bit, whereas SRAM requires 6 transistors per data bit. For this reason, DRAM can be used in situations requiring larger data loads in smaller locations. However, SRAM may be advantageous in situations requiring faster data transfer speeds with lower power consumption, as data does not have to be refreshed to account for leaky capacitors.

The non-volatile memory 203 may be any suitable non-volatile memory (e.g., memory maintained without a power source). For example, the non-volatile memory 203 may be Read-Only Memory (ROM), Erasable Programmable Read-Only Memory (EPROM), EEPROM, flash memory, solid-state storage, Non-Volatile Random Access Memory (NVRAM), hard disk drives, floppy disks, magnetic tape, or optical discs. The non-volatile memory 203 may be selected based on the device requirements. For example, ROM may be sufficient if the non-volatile memory 203 does not require reprogramming. For example, ROM may be selected in embodiments in which the non-volatile memory 203 is only used to boot or initialize the authorization dongle 204. In other examples, in which the non-volatile memory 203 may require updating, a programmable non-volatile memory, such as flash memory, may be selected.

The memory controller 216 may contain logical circuitry configured to read and write to the volatile and non-volatile memory 202, 203 on the authorization dongle 204, as well as to control the transfer of data between the authorization dongle 204 and the secure device 220 and/or the secure server. The memory controller 216 may also contain logic configured to refresh the volatile memory (i.e., recharge the capacitors). The logic may contain a multiplexer circuit which may be configured to select row and column data addresses of the volatile memory 202 for reading/writing. The volatile memory 202 may contain a demultiplexer circuit which may be configured to use row and column addresses to select memory location on the volatile memory 202.

The memory controller 216 may be configured to perform operations of the disclosure. For example, the memory controller 216 may be configured to establish communication links with the secure device and secure server. Furthermore, the memory controller 216 may be configured to request, upon powering on, the encryption key from the secure server. The memory controller 216 may be configured to validate the secure device (e.g., determine which key is needed based on a device ID, and/or authenticate a user name/password before requesting a key). In some embodiments, the memory controller 216 may be configured to validate the network 208 and/or secure server. The memory controller may be configured to transfer information to the secure server, network 208, and secure device 220.

While the memory bus 240 and I/O bus 242 are shown in FIG. 2 as a single bus structure providing a direct communication path among the volatile and non-volatile memory 202, 203, the memory controller 216, the network adapter 214, and the data connector 218, the memory bus 240 and I/O bus 242 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. The memory bus 240 and I/O bus 242 may be made with any suitable circuitry, such as electrical wires or optical fibers. Furthermore, the memory and I/O buses 240, 242 may have any suitable width (e.g., 8-bit, 64-bit, 128-bit, 512-bit).

The data connector 218 may be any suitable connector which is configured to allow data transfer between the secure device 220 and the authorization dongle 204. The data connector 218 may be configured to allow installation of the encryption key on the secure device 220. Various connections may be used, including Universal Serial Bus (USB), Serial Advanced Technology Attachment (SATA), eSATA, Ethernet, FireWire, BLUETOOTH (BLUETOOTH SIG, INC. CORPORATION DELAWARE 5209 Lake Washington Boulevard NE Suite 350 Kirkland Wash. 98033), WiFi, WiMax, or ZIGBEE (ZigBee Alliance CORPORATION CALIFORNIA 2400 Camino Ramon, Suite 375 San Ramon Calif. 94583). Wired connections, such as USB, may be advantageous as they provide control, security, reliability, and speed depending on the selected connection. In wired examples, there is less risk data transfer will be disconnected due to poor connection, the flow may be consistent and selective, and there may be less risk of data interception. There may also be speed advantages, as data transfer may occur with lower latency, and without the risk of wireless interference. Wireless connections, such as Bluetooth, may be advantageous as they reduce problems associated with wired systems, such as cord congestion or bent cables. Furthermore, wireless connections may be configured to provide data transfer over longer distances, without requiring long spanning cables.

The network adapter 214 may be any suitable adapter which is configured to allow data transfer between the network 208 and the authorization dongle 204. Depending on the type of network used, a proper connection may be selected. The network 208 may be any suitable network for connecting the secure server 210 to the authorization dongle 204. The network 8 may be a local area network (LAN), wide area network (WAN), wireless local area network (WLAN) storage area network (SAN), system area network, or any other suitable network. For example, for a LAN network, the network adapter used may be an Ethernet cable. In wireless examples such as WAN or WLAN, the network adapter may be WiFi.

It may be advantageous to determine whether the authorization dongle 204 is authorized to connect to the network 208 (e.g., when the authorization dongle 204 is powered back on). This may be beneficial in situations in which the secured device 220 is stolen with the authorization dongle 204 attached. This may ensure an unauthorized user does not have access to the encrypted data on the secured device 220, as the secure server may not provide update information, including the encryption key, to the authorization dongle 204. Authorization may require authentication of a user. For example, the authorization protocol may require a password, biometric scanning (e.g., fingerprint, DNA, iris recognition), magnetic field scanning, or any other suitable authentication measure.

The power source for the secure server 210 and secure device 220 may be any suitable power source, such as a power supply or battery. The secure server 210 may power the network 208. On the other hand, the network 208 may also have its own power supply. In some embodiments, the system requirements for the non-volatile storage of the secure server can be kept minimal, as the functionality of the system resides in the encryption key. In these embodiments, a battery power supply may be used, much like a laptop configuration. The secure device 220 may power the authorization dongle 204. In some embodiments, the authorization dongle 204 may not have its own power supply, such that if it is detached from the secure device 220 the volatile memory 202 may be cleared, preventing access from unauthorized users.

Figure 3:
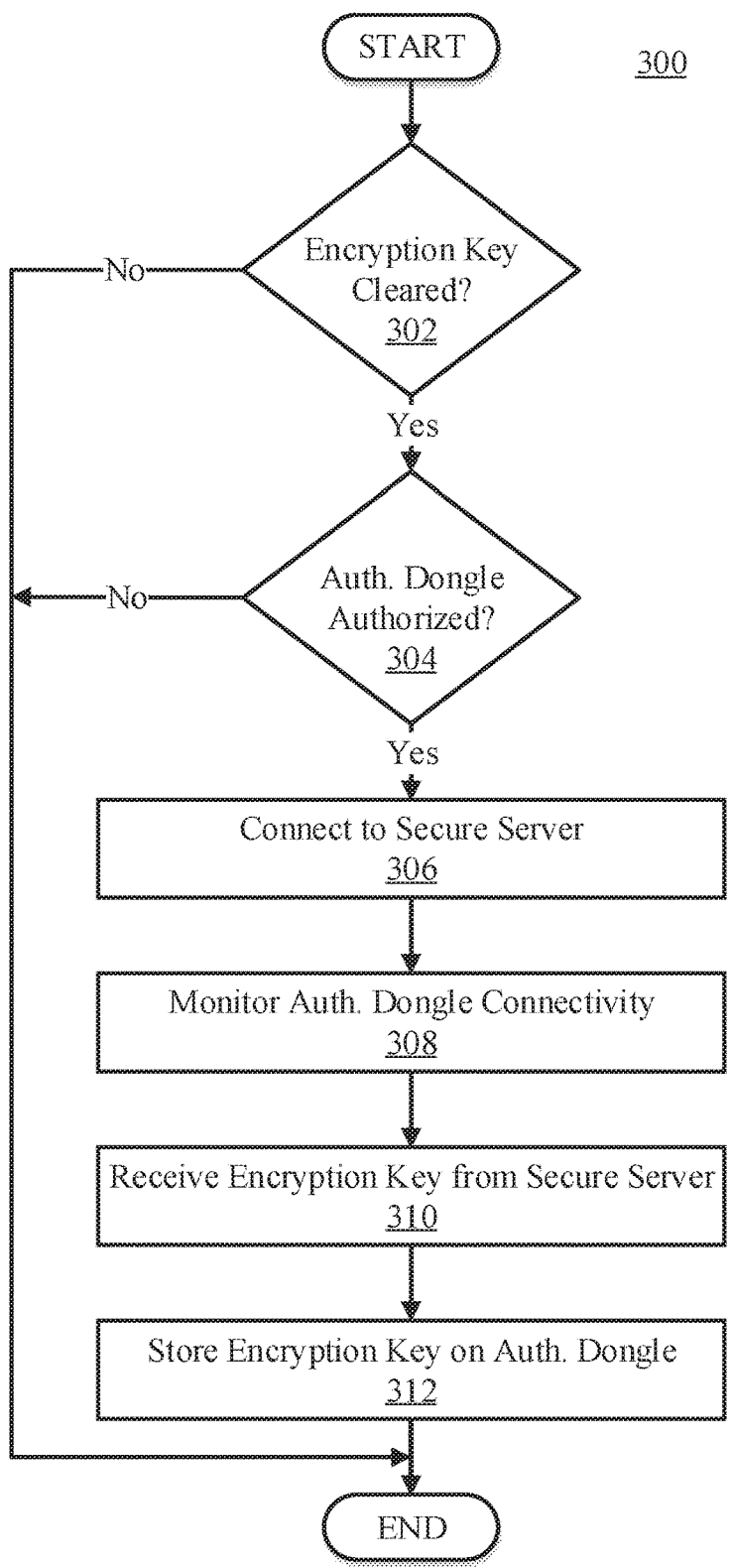
FIG. 3 illustrates a flowchart depicting an example method for receiving encryption key updates from a secure server on an authorization dongle, in accordance with embodiments of the present disclosure.

FIG. 3 illustrates a flow chart of an example method 300 for updating an authorization dongle with authorization data from a secure server. The authorization dongle system, authorization dongle, secure server, secure device, network, volatile memory, non-volatile memory, data connector, and network adapter, may be substantially the same as the authorization dongle system 1, authorization dongle 4, secure server 10, secure device 20, network 8, volatile memory 2, non-volatile memory 3, data connector 18, and network adapter 14 previously described in reference to FIG. 1. The method 300 may be performed by a processor (e.g., a processor in a secure server or secure device) or memory controller. In some embodiments, one or more operations of method 300 may be performed by a user, or by the processor or memory controller in response to user input.

The method 300 may begin at operation 302, where components of the authorization dongle system may be configured to determine whether the volatile memory on the authorization dongle is cleared/corrupted. In some embodiments, the secure device, authorization dongle, or secure server may include a program or device configured to determine if the volatile memory is empty or corrupted. In some examples, the program or device may compare the current volatile memory state to the authorization data state used to access the encrypted data. In some embodiments, the secure device, authorization dongle, or secure server may include a program or device configured to determine if the power supply to the authorization dongle or secure device has been disconnected. If the program or device determines the power supply has been disconnected, the program may be configured to indicate the volatile memory has been cleared/corrupted. An indication that the memory has been cleared may be transferred to the secure server, to allow replacement of the encryption key. An indication the memory has not been cleared or corrupted may end the encryption key replacement process, as the key may still be present on the authorization dongle.

If the encryption key is determined to be cleared at operation 302, a determination of whether the authorization dongle is authorized to access the network or secure server may be made at operation 304. In some embodiments, determining whether the authorization dongle is authorized to access the network or secure server may be in response to authenticating the user. As previously described, if the secure device is stolen with the authorization dongle, it may be beneficial to authenticate a user before authorizing access to the secure server. In some embodiments, the authorization dongle may request access to the network. Likewise, the network may request authentication information from the authorization dongle. Any suitable authentication protocol may be used, including a password, biometric scanner, or magnetic field scanner. In some embodiments, wherein the authorization dongle connects directly to the secure server, authentication may occur at the secure server.

Once authenticated, the user and/or authorization dongle may connect to the secure server, as shown in operation 306. In embodiments which do not require authentication, the user may directly connect to the secure server (e.g., without authentication). The connection between the secure server and authorization dongle may be any suitable wired or wireless connection. For example, in some embodiments, a network may be implemented to allow data transfer from the authorization dongle to a remotely located secure server. In these embodiments, the authorization dongle may use a network adapter to connect to the network or secure server. In some embodiments, the authorization dongle may be directly wired to the secure server.

At operation 308, the connectivity between the secure server and authorization dongle may be monitored. In some embodiments, the secure server administers a connectivity module to monitor connectivity between the secure server and authorization dongle. When connection is lost, the connectivity module may stop sending the encryption key. This may prevent interception of the encryption key. In some embodiments, a peripheral device may monitor the connectivity between the secure server and authorization dongle to determine if the secure server should reserve data transfer of the encryption key. Any other suitable connectivity monitoring protocol may be used to prevent encryption key interception. In embodiments with multiple authorization dongles, the connectivity monitoring protocol may be configured to command the secure server to stop transmitting encryption key data to each respective disconnected authorization dongle.

At operation 310, the authorization dongle may receive the encryption key from the secure server. Through a connection, as mentioned in operation 306, the secure server may send the encryption key stored in the non-volatile memory to the authorization dongle. If the authorization dongle is connected to the secure server via a network, the authorization dongle may receive the encryption key via a network adapter. However, if the authorization dongle is directly wired to the secure server or network, the authorization dongle may receive the encryption key via a port (e.g., USB or Ethernet).

At operation 312, the authorization dongle may store the encryption key in the volatile memory. The authorization dongle may include circuitry and a memory controller configured to transfer the encryption key data into the volatile memory.

The aforementioned operations may be completed in any order and are not limited to those described. Additionally, some, all, or none of the aforementioned operations may be completed, while still remaining within spirit and scope of the present invention.

Figure 4:
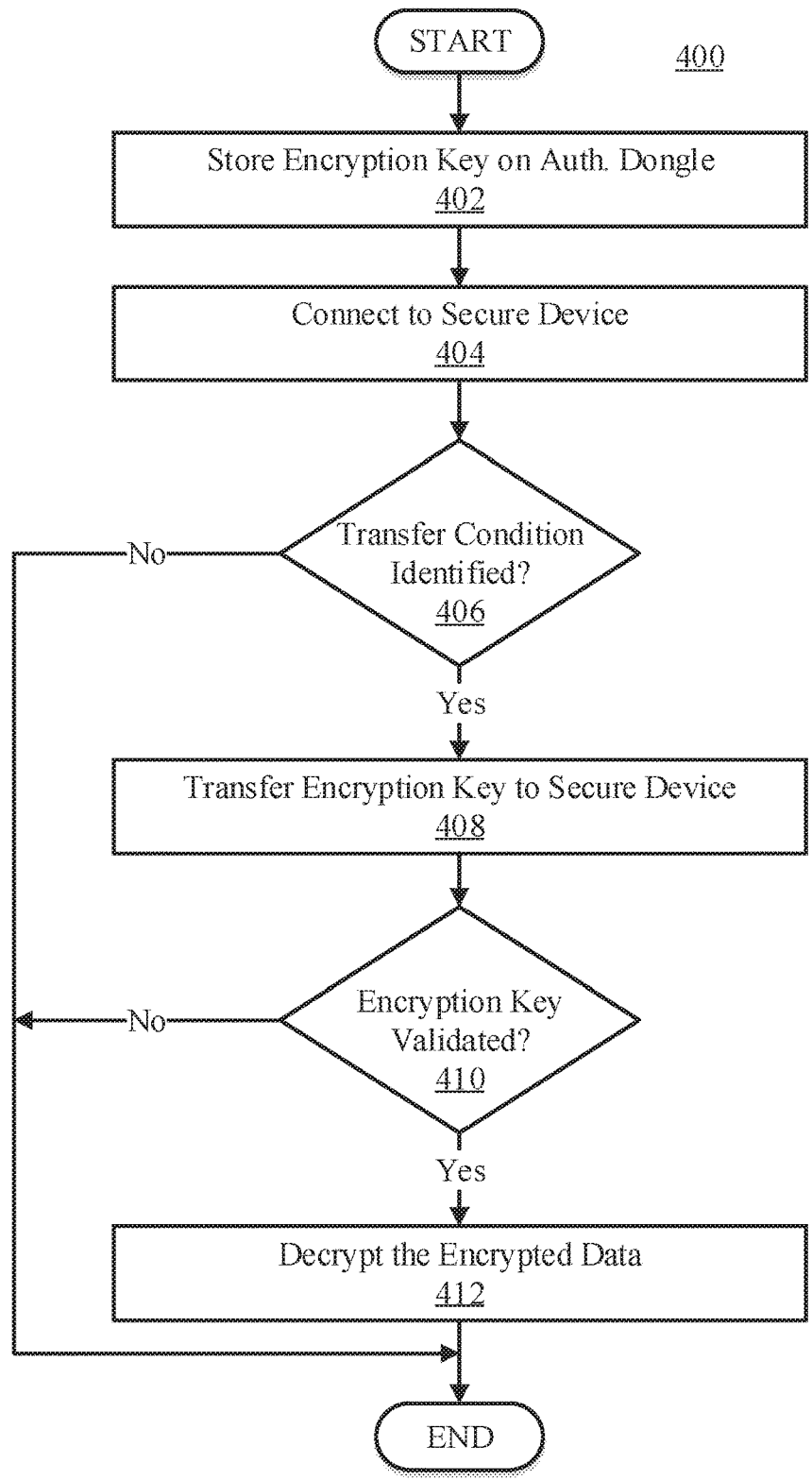
FIG. 4 illustrates a flowchart depicting and example method for using an authorization dongle to access encrypted data on a secured device, in accordance with embodiments of the present disclosure.

FIG. 4 illustrates a flowchart of an example method 400 for transferring the encryption key from the authorization dongle to the secure device, in accordance with embodiments of the present disclosure. The method 400 may be performed by a processor (e.g., a processor in a secure server or secure device) or memory controller. In some embodiments, one or more operations of method 400 may be performed by a user, or by the processor or memory controller in response to user input. The method 400 may begin at operation 402, where the encryption key may be stored on the authorization dongle.

In some embodiments, the encryption key is stored in volatile memory of the authorization dongle according to method 300. However, the encryption key may be stored in the volatile memory of the authorization dongle using any suitable method. For example, the encryption key may be transferred onto the volatile memory of the authorization dongle by connecting memory directly into the authorization dongle (e.g., plugging flash memory into the authorization dongle while connected to a power source).

At operation 404, the authorization dongle may connect to the secure device (e.g., establish a communication link with the secure device). Connecting the authorization dongle to the secure device may allow data transfer to occur between the authorization dongle and secure device. The authorization dongle may connect to the secure device in any manner. In some embodiments, the authorization dongle utilizes a physical connection (e.g., USB connection). In some embodiments, the authorization dongle may utilize a wireless connection (e.g., Bluetooth).

At operation 406, the secure device may determine whether a transfer condition has been identified. A transfer condition may be a condition that permits transferring the encryption key from the authorization dongle to the secure device. This may ensure the encrypted data is not decrypted by an unauthorized user. In some embodiments, the transfer condition may be authentication by the user. For example, the transfer condition may require the user to input a user name and/or password that must be validated prior to transferring the encryption key. In other examples, the user may be authenticated via biometric parameters or magnetic field scanners. However, any authentication protocol may be used. In some embodiments, the transfer condition may identify the authorization dongle is a match to the secure device. After the transfer condition is satisfied (e.g., a user is authenticated or there is a match between the authorization dongle and secure device), data transfer may occur. If the transfer condition is not satisfied (e.g., incorrect password), the secure device may repeat the request for the transfer condition (e.g., ask the user to re-input the password). In some embodiments, the secure device requests the transfer condition a fixed number of times (e.g., locks the password), to prevent unauthorized users from attempting to satisfy the transfer condition with a range of password attempts.

If a transfer condition is identified at operation 406, the data on the authorization dongle may be transferred to the secure device at operation 408. In some embodiments, the secure device uses an encryption key retrieval module to fetch the encryption key from the authorization dongle. However, the data may be transferred to the secure device by any means. For example, data may be transferred by a data transfer module associated with the memory controller on the authorization dongle. Data transfers from the authorization dongle to the secure device may be done via the data connector.

At operation 410, the secure device may validate the encryption key to determine whether it corresponds to the encrypted data and/or secure device. The secure device may validate the encryption key via an encryption algorithm module (e.g., the module used to encrypt the data). If the secure device determines the encryption key matches the encryption algorithm, the secure device may decrypt the encrypted data volume at operation 412, allowing a user to access data on the secure device. If the secure device determines the encryption key is not a match, no decryption occurs and the user may not access data on the secure device.

The aforementioned operations may be completed in any order and are not limited to those described. Additionally, some, all, or none of the aforementioned operations may be completed, while still remaining within the spirit and scope of the present invention.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Figure 5:
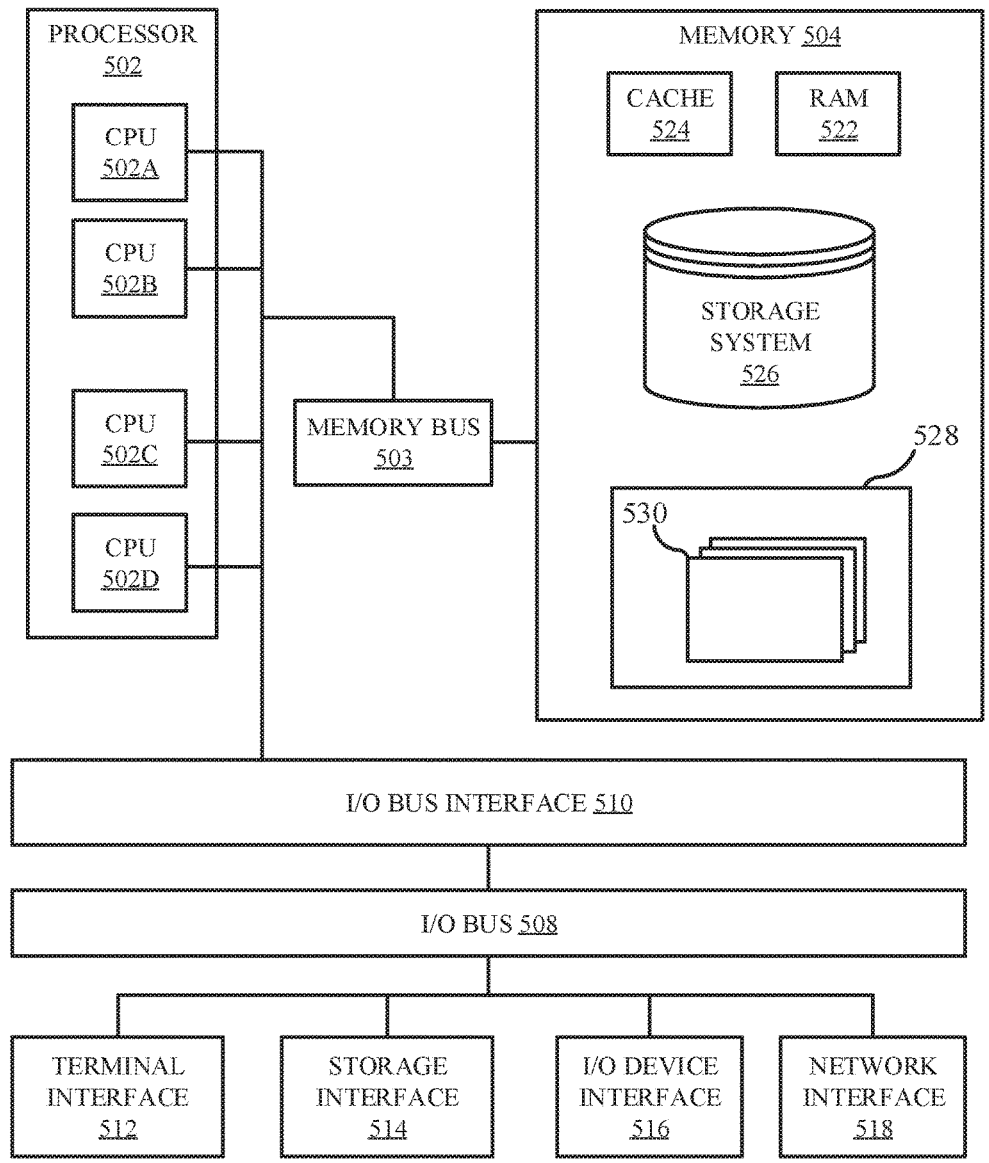
FIG. 5 illustrates a high-level block diagram of an example computer system that may be used in implementing one or more of the methods, tools, and modules, and any related functions described herein, in accordance with embodiments of the present disclosure.

Referring now to FIG. 5, shown is a high-level block diagram of an example computer system 501 (e.g., secure server 10 and secure device 20) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

The computer system 501 may model multiple components of the authorization dongle system, such as the secure server and secure device. It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary. The components may vary between the secure server and secure device.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, user interfaces, and program data. Each of the operating systems, one or more application programs, other program modules, and program data or some combination thereof, may include an implementation of a networking environment. Program modules 530 generally perform the functions or methodologies of various embodiments.

For example, in an embodiment of the present disclosure, the program modules 530 of the secure server may include an encryption key management module. The encryption key management module may include computer instructions to manage the mirrored images of encryption key data on the volatile memory of the authorization dongle. In some embodiments, the encryption key management module may issue a command to the secure server to transfer the encryption key data to the authorization dongle in response to a condition.

In some embodiments, the encryption key management module may include computer instructions to compare the authorization data image present on the non-volatile storage of the secure server to the current state on the volatile memory of the authorization dongle. If the encryption key management module determines the data images between the storage states are different, it may issue a command to the secure server to transfer the authorization data image to the authorization dongle. If the data images between the storage states are the same, it may not issue a command to the secure server to transfer the authorization data image to the authorization dongle. In some embodiments, the encryption key management module may include computer instructions configured to determine if the authorization dongle power source has been disconnected. If the power has been disconnected, the encryption key management module may issue a command to the secure server to transfer the encryption key data present on the non-volatile memory of the secure server to the authorization dongle.

In some embodiments, the encryption key management module does not issue a command in response to a condition, but may issue a command to transfer the encryption key data periodically. The encryption key management module may manage the mirrored images on the volatile memory of the authorization dongle in any other suitable manner.

The program modules 530 of the secure server may also include a connectivity module. The connectivity module may include computer instructions to monitor the connection between the secure server and the authorization dongle. In some embodiments, if the connection between the secure server and authorization dongle is severed, the connectivity module may issue a command to the secure server to stop transmitting encryption key data. In other embodiments, in which there may be multiple authorization dongles connected to the same secure server, the connectivity module may issue a command to stop transmitting encryption key data respective to the disconnected authorization dongle.

The secure device program modules 530 may include an encryption module. The encryption module may include computer instructions to encrypt data present on the secure device, to prevent access from unauthorized users. The computer instructions on the encryption module may include one or more encryption algorithm(s). The data on the secure device may be encrypted using any encryption algorithm. The encryption algorithm may be symmetric or asymmetric. For example, the encryption algorithm may be Triple DES, RSA, Blowfish, Twofish, or Advanced Encryption Standard (AES) or any other suitable encryption algorithm. The encryption key may be complementary to the selected encryption algorithm. The encryption module may have any type or number of encryption algorithms respective to the encryption requirements in the environment.

Furthermore, program modules 530 of the secure device may include an encryption key retrieval module. The encryption key retrieval module may include computer instructions to fetch the encryption key from the authorization dongle, and transfer it to the encryption module to decrypt the data present on the secure device. The encryption key retrieval module may also store the encryption key in memory 504 of the secure device.

In the case that the authorization dongle is removed from the secure device, the encryption data may be removed from the secure device. The program modules 530 of the secure device may include an encryption key removal module, which may include computer instructions to clear the encryption key from the secure device memory 704. The encryption key removal module may also be configured to remove the encryption key from the encryption module remotely.

The computer system 501 may interface a variety of peripheral devices, storage devices, and networks through the terminal interface 512, storage interface 514, I/O device interface 516, and network interface 518. The network interface 518 may communicatively couple the secure device and secure server to any type or number of networks. For example, the network interface 518 of the secure server and secure device may include a wired or wireless network adapter. The network adapter may communicatively couple the secure device or secure server to the network previously described. The I/O device interface 516 may be configured to communicatively couple the secure server or secure device to any type or number of peripheral devices, including mice, printers, and keyboards. The storage interface 514 may be configured to communicatively couple the secure device and secure server to storage devices (e.g., flash memory USBs, CD-ROMS, Micro SD Cards). For example, in some embodiments, the secure device may include a storage interface 514 to communicatively couple the authorization dongle to the secure device. The data connector of the authorization dongle may communicatively couple the authorization dongle to the secure device through the storage interface 514.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
    establishing a communication link between an authorization dongle and a secure device, the authorization dongle being communicatively coupled with the secure device using a data connector, the secure device having encrypted data stored thereon;
    establishing a communication link between the authorization dongle and a secure server, the authorization dongle being communicatively coupled with the secure server using a network adapter;
    receiving an encryption key from the secure server, the encryption key being associated with the encrypted data stored on the secure device;
    storing the encryption key on volatile memory of the authorization dongle;
    receiving, from the secure device, an indication that a user is attempting to access the encrypted data stored on the secure device;
    transmitting, in response to the user attempting to access the encrypted data stored on the secure device, the encryption key from the authorization dongle to the secure device;
    receiving a second indication that the encryption key is cleared from the volatile memory, wherein the encryption key is cleared as a result of the communication link between the authorization dongle and the secure device being severed;
    determining that the authorization dongle is authorized to access the secure server;
    establishing, in response to the determination that the authorization dongle is authorized to access the secure server, a second communication link between the authorization dongle and the secure server; and
    restoring, by the authorization dongle, the encryption key using updates received from the secure server in response to the second indication that the encryption key is cleared from the volatile memory.

2. The method of claim 1, wherein the secure server manages encryption key data located in non-volatile memory of the secure server.

3. The method of claim 1, further comprising:
    transmitting, by the authorization dongle, authentication data to the secure server, wherein the authentication data allows the authorization dongle to establish a communication link to the secure server.

4. The method of claim 1, wherein the secure server monitors connectivity between the authorization dongle and the secure server, wherein the secure server stops transmitting the encryption key to the authorization dongle if the connectivity has been lost.

5. The method of claim 1, wherein the data connector is a Universal Serial Bus (USB) connector.

6. The method of claim 1, further comprising storing configuration information on the authorization dongle, wherein the secure device will not boot without transferring the configuration information from the authorization dongle to the secure device.

7. A system comprising:
    volatile memory;
    a data connector;
    a network adapter;
    a memory controller communicatively coupled to the volatile memory, the network adapter, and the data connector, wherein the memory controller is configured to perform a method comprising:
        establishing a communication link with a secure device, the memory controller being communicatively coupled with the secure device using the data connector, the secure device having encrypted data stored thereon;
        establishing a communication link with a secure server, the memory controller being communicatively coupled with the secure server using the network adapter;
        receiving an encryption key from the secure server, the encryption key being associated with the encrypted data stored on the secure device;
        storing the encryption key on the volatile memory;
        receiving, from the secure device, an indication that a user is attempting to access the encrypted data stored on the secure device;

transmitting, in response to the user attempting to access the encrypted data stored on the secure device, the encryption key from the memory controller to the secure device;

receiving a second indication that the encryption key is corrupted in the volatile memory, wherein the encryption key is corrupted as a result of the communication link between the memory controller and the secure device being severed;

determining that the memory controller is authorized to access the secure server;

establishing, in response to the determination that the memory controller is authorized to access the secure server, a second communication link between the memory controller and the secure server; and restoring the encryption key using updates received from the secure server in response to the second indication that the encryption key is corrupted in the volatile memory.

8. The system of claim 7, wherein the data connector is a Universal Serial Bus (USB) connector.

9. The system of claim 7, wherein the method performed by the memory controller further comprises storing configuration information in the volatile memory, wherein the configuration information is necessary to boot the secure device.

10. The system of claim 9, wherein the method performed by the memory controller further comprises transferring, in response to the secure device attempting to boot, the configuration information to the secure device.

11. A computer program product comprising a non-transitory computer readable storage medium having program instructions embodied therewith, the program instructions executable by a processor to cause the processor to perform a method comprising:

establishing a communication link between an authorization dongle and a secure device, the authorization dongle being communicatively coupled with the secure device using a data connector, the secure device having encrypted data stored thereon;

establishing a communication link between the authorization dongle and a secure server, the authorization dongle being communicatively coupled with the secure server using a network adapter;

receiving an encryption key from the secure server, the encryption key being associated with the encrypted data stored on the secure device;

storing the encryption key on volatile memory of the authorization dongle;

receiving, from the secure device, an indication that a user is attempting to access the encrypted data stored on the secure device;

transmitting, in response to the user attempting to access the encrypted data stored on the secure device, the encryption key from the authorization dongle to the secure device;

receiving a second indication that the encryption key is cleared from the volatile memory, wherein the encryption key is cleared as a result of the communication link between the authorization dongle and the secure device being severed;

determining that the authorization dongle is authorized to access the secure server;

establishing, in response to the determination that the authorization dongle is authorized to access the secure server, a second communication link between the authorization dongle and the secure server; and restoring, by the authorization dongle, the encryption key using updates received from the secure server in response to the second indication that the encryption key is cleared from the volatile memory.

12. The computer program product of claim 11, wherein the secure server manages encryption key data located in non-volatile memory of the secure server.

13. The computer program product of claim 11, wherein the method performed by the processor further comprises:

transmitting, by the authorization dongle, authentication data to the secure server, wherein the authentication data allows the authorization dongle to establish a communication link to the secure server.

14. The computer program product of claim 11, wherein the secure server monitors connectivity between the authorization dongle and the secure server, wherein the secure server stops transmitting the encryption key to the authorization dongle if the connectivity has been lost.

15. The computer program product of claim 11, wherein the data connector is a Universal Serial Bus (USB) connector.

16. The computer program product of claim 11, wherein the method performed by the processor further comprises storing configuration information on the authorization dongle, wherein the secure device will not boot without transferring the configuration information from the authorization dongle to the secure device.

* * * * *